United States Patent
Okada et al.

(10) Patent No.: US 9,404,547 B2
(45) Date of Patent: Aug. 2, 2016

(54) STEEL FOR HIGH-STRENGTH SPRING, METHOD FOR PRODUCING SAME, AND HIGH-STRENGTH SPRING

(71) Applicant: NHK SPRING CO., LTD., Yokohama-shi, Kanagawa (JP)

(72) Inventors: Hideki Okada, Yokohama (JP); Akira Tange, Yokohama (JP); Koichi Tango, Yokohama (JP); Isao Sumiyoshi, Yokohama (JP)

(73) Assignee: NHK SPRING CO., LTD., Yokohama-Shi, Kanagawa (JP)

(*) Notice: Subject to any disclaimer, the term of this patent is extended or adjusted under 35 U.S.C. 154(b) by 534 days.

(21) Appl. No.: 13/886,106

(22) Filed: May 2, 2013

(65) Prior Publication Data
US 2013/0240093 A1 Sep. 19, 2013

Related U.S. Application Data

(63) Continuation of application No. PCT/JP2011/074290, filed on Oct. 21, 2011.

(30) Foreign Application Priority Data

Nov. 11, 2010 (JP) ................................. 2010-252856

(51) Int. Cl.
*F16F 1/02* (2006.01)
*C22C 38/42* (2006.01)
(Continued)

(52) U.S. Cl.
CPC . *F16F 1/021* (2013.01); *C21D 7/06* (2013.01); *C21D 8/06* (2013.01); *C21D 8/065* (2013.01);
(Continued)

(58) Field of Classification Search
CPC .............. C22C 38/42; F16F 1/02; C21D 8/06
USPC .............................. 148/332, 504, 580; 420/91
See application file for complete search history.

(56) References Cited

U.S. PATENT DOCUMENTS 5,508,002 A 4/1996 Kawaguchi et al.
5,846,344 A 12/1998 Kawaguchi et al.
(Continued)

FOREIGN PATENT DOCUMENTS

CN 101001969 A 7/2007
CN 101624679 A 1/2010
(Continued)

OTHER PUBLICATIONS

Chinese Office Action dated Jul. 7, 2014 in counterpart Chinese Application No. 201180054020.1.
(Continued)

*Primary Examiner* — Brian Walck
(74) *Attorney, Agent, or Firm* — Holtz, Holtz & Volek PC

(57) ABSTRACT

A steel for high-strength spring has an $Ac_3$ transformation temperature as an indicator of the decarburization performance, which is calculated by Equation (1) below, is from 859 to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55.

$$Ac_3 = 910 - 203 \times \sqrt{C} - 15.2Ni + 44.7Si + 104V + 31.5Mo + 13.1W \quad (1)$$

$$DI = D_O \times f_{Si} \times f_{Mn} \times f_P \times f_S \times f_{Cu} \times f_{Ni} \times f_{Cr} \quad (2)$$

$$HRC = 38.99 + 17.48C + 2.55Si - 2.28Ni + 2.37Cr + 8.04Ti \quad (3)$$

wherein, $D_0 = 8.65 \times \sqrt{C}$, $f_{Si} = 1 + 0.64 \times \%$ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

7 Claims, 4 Drawing Sheets

(51) Int. Cl.
- *C21D 8/06* (2006.01)
- *C21D 7/06* (2006.01)
- *C21D 9/02* (2006.01)
- *C22C 38/00* (2006.01)
- *C22C 38/04* (2006.01)
- *C22C 38/06* (2006.01)
- *C22C 38/34* (2006.01)
- *C22C 38/50* (2006.01)
- *C22C 38/02* (2006.01)

(52) U.S. Cl.
CPC ............... *C21D 9/02* (2013.01); *C22C 38/001* (2013.01); *C22C 38/02* (2013.01); *C22C 38/04* (2013.01); *C22C 38/06* (2013.01); *C22C 38/34* (2013.01); *C22C 38/42* (2013.01); *C22C 38/50* (2013.01); *F16F 1/02* (2013.01)

(56) References Cited

U.S. PATENT DOCUMENTS

| | | |
|---|---|---|
| 6,193,816 B1 | 2/2001 | Nakano et al. |
| 2006/0060269 A1 | 3/2006 | Nakano et al. |
| 2007/0256765 A1 | 11/2007 | Kimura et al. |
| 2009/0020189 A1 | 1/2009 | Yoshihara et al. |

FOREIGN PATENT DOCUMENTS

| | | | |
|---|---|---|---|
| EP | 2017358 A2 * | 1/2009 | ............... C21D 8/06 |
| JP | 7-173577 A | 7/1995 | |
| JP | 11-241143 A | 9/1999 | |
| JP | 2003-253391 A | 9/2003 | |
| JP | 2004-010965 A | 1/2004 | |
| JP | 2009-046763 A | 3/2009 | |
| JP | 2009-046764 A | 3/2009 | |
| WO | WO 2004/085685 A1 | 10/2004 | |
| WO | WO 2006/022009 A1 | 3/2006 | |

OTHER PUBLICATIONS

Chinese Office Action dated Mar. 9, 2015, issued in counterpart Chinese Application No. 201180054020.1.

International Search Report dated Jan. 24, 2012 issued in parent International Application No. PCT/JP2011/074290.

English translation of an International Preliminary Report on Patentability (IPRP) including Written Opinion mailed May 23, 2013 in parent International Application No. PCT/JP2011/074290.

\* cited by examiner

STEEL FOR HIGH-STRENGTH SPRING, METHOD FOR PRODUCING SAME, AND HIGH-STRENGTH SPRING

CROSS REFERENCE TO RELATED APPLICATIONS

This application is a Continuation Application of PCT Application No. PCT/JP2011/074290, filed Oct. 21, 2011 and based upon and claiming the benefit of priority from prior Japanese Patent Application No. 2010-252856, filed Nov. 11, 2010, the entire contents of all of which are incorporated herein by reference.

BACKGROUND OF THE INVENTION

1. Field of the Invention

The present invention relates to a steel for high-strength spring which is used as a spring part for vehicle, a method for producing the same, and a high-strength spring produced by the method.

2. Description of the Related Art

Under an environmental assessment to prevent global warming, it has been desired to attain lighter bodies in order to control the emission of carbon dioxide gas in the automobile industry. An approach for achieving the demand for lighter bodies includes enhancing the strength of a coil spring for supporting bodies. On the other hand, the coil spring for supporting bodies is exposed to a severe corrosive environment, and thus the durability is required.

In order to ensure the durability of the coil spring in the corrosive environment, the research and development for improving the corrosion resistance of materials by adding alloy elements such as Ni, Cr, Mo, and V, which are effective for corrosion resistance, have been carried out and various types of proposals have been made. As for the means for improving the corrosion resistance and delayed fracture resistance, for example, in the case of a high-strength steel for coil spring produced by adding expensive alloy elements, such as Ni, Cr, Mo, and V (hereinafter referred to as "existing high Cr steel") described in Patent Literature 1, the additive amount of each alloy element is increased as the usage environment becomes severe. Consequently, the material cost is increased. A large additive amount of Cr causes not only high-cost but also instability of a raw material supply system. Physically, this leads to a disadvantage that the corrosion pit becomes an acute angle. That is, Cr acts positively on the general corrosion, while it acts negatively on the corrosion pit (pitting), i.e., a trade-off relationship. It is unclear where the optimal value of the Cr content as the additive amount exists.

Further, Ni has an effect of improving the corrosion resistance and an effect of increasing the amorphous composition of the rust and decreasing the aspect ratio of the corrosion pit. This causes not only an increase in cost but also instability of a raw material supply system because Ni-producing countries and areas are unevenly distributed.

From such a background, the study for eliminating the unstable factors has been further proceeded and various types of proposals have been made. For example, Patent Literature 2 describes a high-strength steel for coil spring which is produced to have a desired high strength with a low Cr content and a low Ni content. In Patent Literature 2, it is suggested that composition ratios of constituent elements are specified using three parameters Ceq 1, Ceq 2, and Ceq 3 in order to realize the steel for high-strength spring which contains a small amount of alloys.

CITATION LIST

Patent Literature

Patent Literature 1: Jpn. Pat. Appln. KOKAI Publication No. 7-173577
Patent Literature 2: Jpn. Pat. Appln. KOKAI Publication No. 2009-046764

BRIEF SUMMARY OF THE INVENTION

However, the present inventors have retested and examined the performance of the steel for spring described in Patent Literature 2 (hereinafter referred to as "conventional steel), and thus they have found out that steels in which the corrosion lifetime does not reach a practical use level as a coil spring are contained in conventional steel. That is, it is found that the analysis based on the three parameters Ceq 1, Ceq 2, and Ceq 3 in Patent Literature 2 is sufficient in terms of the strength, however it is insufficient in terms of the corrosion lifetime (corrosion durability). Therefore, when the conventional steel is comprehensively examined, it does not necessarily have necessary and sufficient performance as a steel for coil spring.

The present invention has been made to solve the above problems. An object thereof is to provide a steel for high-strength spring which achieves high strength, contains a small amount of alloy elements of Ni, Cr, Mo, and V, is low-cost, and further has a corrosion lifetime for practical purposes, which is excellent in corrosion resistance and pitting resistance at a defined composition ratio, a method for producing the same, and a high-strength spring.

The steel for high-strength spring according to the present invention (hereinafter referred to as "example steel") comprises C: 0.38 to 0.44%, Si: 2.00 to 2.30%, Mn: 0.79 to 1.25%, Cr: 0.10 to 0.43%, Ni: 0.15 to 0.35%, Cu: 0.15 to 0.35%, Ti: 0.05 to 0.13%, P: 0.02% or less (0% is not included), S: 0.02% or less (0% is not included), Al: 0.003 to 0.10%, N: 0.002 to 0.012%, O: 0.0002% or less (0% is not included), by mass %, and residue consisting of iron and inevitable impurities, wherein an $Ac_3$ transformation temperature as an indicator of the decarburization performance, which is calculated by Equation (1) below, is from 859 to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55.

$$Ac_3 = 910 - 203 \times \sqrt{C} - 15.2Ni + 44.7Si + 104V + 31.5Mo + 13.1W \tag{1}$$

$$DI = D_O \times f_{Si} \times f_{Mn} \times f_P \times f_S \times f_{Cu} \times f_{Ni} \times f_{Cr} \tag{2}$$

$$HRC = 38.99 + 17.48C + 2.55Si - 2.28Ni + 2.37Cr + 8.04Ti \tag{3}$$

wherein, $D_0 = 8.65 \times \sqrt{C}$, $f_{Si} = 1 + 0.64 \times \%$ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

The method for producing a high-strength spring according to the present invention comprises: hot or cold working a steel which comprises C: 0.38 to 0.44%, Si: 2.00 to 2.30%, Mn: 0.79 to 1.25%, Cr: 0.10 to 0.43%, Ni: 0.15 to 0.35%, Cu: 0.15 to 0.35%, Ti: 0.05 to 0.13%, P: 0.02% or less (0% is not included), S: 0.02% or less (0% is not included), Al: 0.003 to 0.10%, N: 0.002 to 0.012%, O: 0.0002% or less (0% is not included), by mass %, and residue consisting of iron and inevitable impurities, wherein an $Ac_3$ transformation temperature as an indicator of the decarburization performance, which is calculated by Equation (1) below, is from 859 to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55, into a wire rod;

rolling the wire rod to be formed into a desired coil spring shape;

subjecting the spring to a heat treatment for hardening and tempering;

hot-setting the spring;

subjecting the spring to hot shot peening; and pre-setting the spring.

$$Ac_3 = 910 - 203 \times \sqrt{C} - 15.2Ni + 44.7Si + 104V + 31.5Mo + 13.1W \quad (1)$$

$$DI = D_O \times f_{Si} \times f_{Mn} \times f_P \times f_S \times f_{Cu} \times f_{Ni} \times f_{Cr} \quad (2)$$

$$HRC = 38.99 + 17.48C + 2.55Si - 2.28Ni + 2.37Cr + 8.04Ti \quad (3)$$

wherein, $D_0 = 8.65 \times \sqrt{C}$, $f_{Si} = 1 + 0.64 \times \% $ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

The terms described herein are defined as follows.

A hardening coefficient $D_O$, which is a coefficient specified by the grain size and the carbon content, is used when calculating the maximum hardened diameter DI. When the grain size number is 7, the hardening coefficient $D_O$ is given by the formula: $8.65 \times \sqrt{C}$. That is, the value (i.e., 8.65) of the hardening coefficient $D_O$ is unambiguously determined when the grain size number is 7. For example, when the grain size number is 6, the coefficient $D_O$ is 9.40. When the grain size number is 8, the coefficient $D_O$ is 7.95.

DETAILED DESCRIPTION OF THE INVENTION

Figure 1:
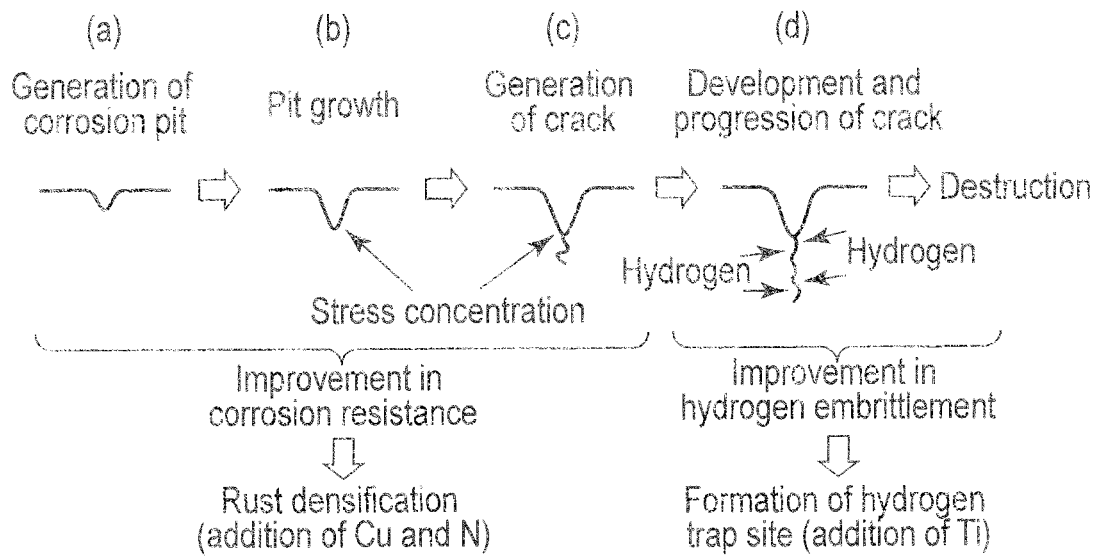
FIG. 1 is a cross-sectional pattern diagram schematically showing a process from the formation of a corrosion pit to the development and progression of a crack.

Hereinafter, preferred embodiments to execute the present invention will be described.

The example steel has the following three main characteristics.

Firstly, the decarburization is an important factor which influences the spring performance, and is also one of the important examination items which must be taken into consideration when determining the composition of steel. As a means for examining the decarburization, there is an $Ac_3$ transformation temperature for specifying a boundary between two-phase and austenite regions. If the $Ac_3$ transformation temperature is low, the heating temperature may be set to lower temperatures. Even if the same heating temperature is used, the permissible temperature to the hardening process can be set to lower temperatures. Accordingly, this is considered to be advantageous for the decarburization. The $Ac_3$ temperature in the optimal composition of the existing high Cr steel is 867° C. Thus, in the example steel, the composition design is examined while ensuring the spring performance (atmospheric durability, sag resistance, and corrosion durability), hardenability, and temper hardness so as to have at least the $Ac_3$ temperature equal to that of the existing high Cr steel. Here, the optimal composition does not necessarily correspond to a center value (arithmetic average) between the upper and lower limits. The optimal composition should be determined by comprehensively evaluating the spring performance, hardenability, and temper hardness, and it is a value slightly lower than an arithmetic average of the upper and lower limits in many cases. As a result, in the case of the optimal composition of the example steel, the $Ac_3$ temperature is 867° C., and the decarburization performance nearly equal to that of the existing high Cr steel can be obtained even under conditions (no-addition of V and the low Ni composition). The $Ac_3$ transformation temperature used as an indicator of the decarburization is calculated using Equation (1). The decarburization level is adjusted so as to be equal to that of the existing high Cr steel. The $Ac_3$ transformation temperature is calculated using Equation (1) and it is a generally known empirical formula. However, these compositions are not determined only by the decarburization and they act positively on the corrosion durability or sag resistance. Thus, the portion which is deteriorated in corrosion durability and sag resistance by reducing the contents of Ni and V is made up, and the compositions are adjusted so that the $Ac_3$ transformation temperature and temper hardness are equal to those of the existing high Cr steel.

Secondly, the spring hardness is an important factor which influences the spring performance. It is very important to obtain uniform hardness regardless of the wire diameter or size of the spring. Therefore, it is necessary to perform an examination, taking into consideration the hardenability. The maximum hardened diameter DI is used to examine the hardenability in the present invention. In order to calculate the maximum hardened diameter DI, the equation of H. Hollomon & L. D. Jaffe, which is expressed by Equation (2) above, is used.

Thirdly, the temper hardness specifies the final hardness of the coil spring and has a large impact on the spring performance. If the same hardness can be obtained at the same tempering temperature as that of the existing high Cr steel, it is possible to produce the spring without changing the tempering temperature. Consequently, it is one of the important factors, taking into consideration the productivity of the spring. Equation (3) above is used to calculate the temper hardness. Equation (3) above is a regression equation (empirical formula) which is obtained by performing a multivariate analysis on the results of different types of steels subjected to the test in the past. As is the case with the decarburization, the composition of the steel composition is not determined according to only the temper hardness. The composition of the steel composition is adjusted so as to comprehensively satisfy the corrosion durability, sag resistance, $Ac_3$ transformation temperature, decarburization, and the like. The temper hardness of the existing high Cr steel at a tempering temperature T° C. is 52.5 HRC in the case of the optimal composition. On the other hand, in the case of the example steel, the temper hardness at the tempering temperature T° C. is 52.6 HRC. As described above, the contents of C, Si, Ni, Cr, and Ti are adjusted so that the same temper hardness is obtained using the optimal composition.

The steel for high-strength spring of the present invention, comprising the three characteristics, the method for producing a high-strength spring, and the high-strength spring will be enumerated below.

(1) The steel for high-strength spring of the present invention comprises C: 0.36 to 0.44%, Si: 2.00 to 2.30%, Mn: 0.79 to 1.25%, Cr: 0.10 to 0.43%, Ni: 0.15 to 0.35%, Cu: 0.15 to 0.35%, Ti: 0.05 to 0.13%, P: 0.02% or less (0% is not included), S: 0.02% or less (0% is not included), Al: 0.003 to 0.10%, N: 0.002 to 0.012%, O: 0.0002% or less (0% is not included), by mass %, and residue consisting of iron and inevitable impurities, wherein an $Ac_3$ transformation temperature as an indicator of the decarburization performance, which is calculated by Equation (1) below, is from 859 to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55.

$$Ac_3 = 910 - 203 \times \sqrt{C} - 15.2Ni + 44.7Si + 104V + 31.5Mo + 13.1W \quad (1)$$

$$DI = D_0 \times f_{Si} \times f_{Mn} \times f_P \times f_S \times f_{Cu} \times f_{Ni} \times f_{Cr} \quad (2)$$

$$HRC = 38.99 + 17.48C + 2.55Si - 2.28Ni + 2.37Cr + 8.04Ti \quad (3)$$

wherein, $D_0 = 8.65 \times \sqrt{C}$, $f_{Si} = 1 + 0.64 \times \%$ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

Figure 2:
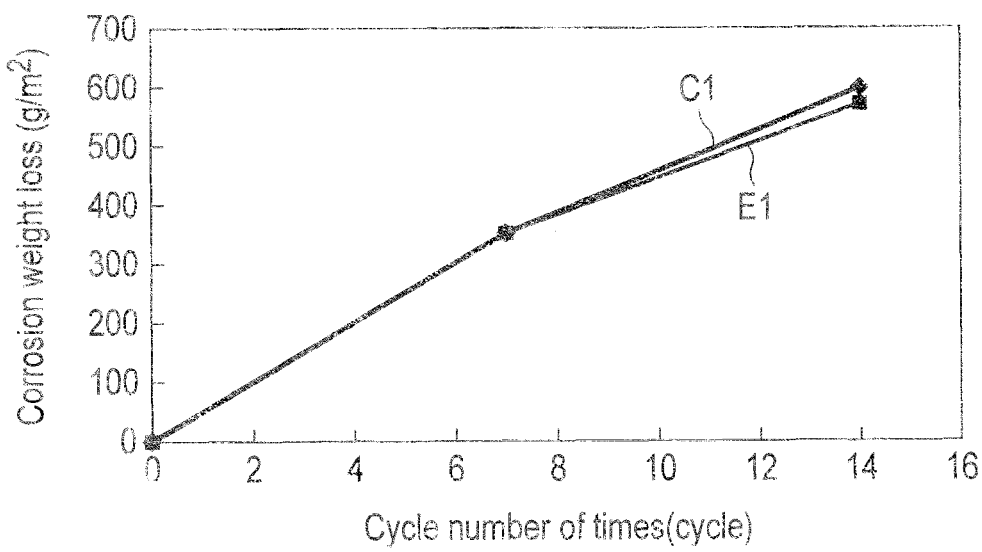
FIG. 2 is a characteristic diagrammatic view showing a correlation between the repetition cycle number and the corrosion weight loss as compared each example with each comparative example.

According to the present invention, in spite of the small additive amount of the alloy elements, the corrosion weight loss in the corrosive environment becomes nearly equal to or lower than that of the existing high Cr steel (FIG. 2).

Figure 3:
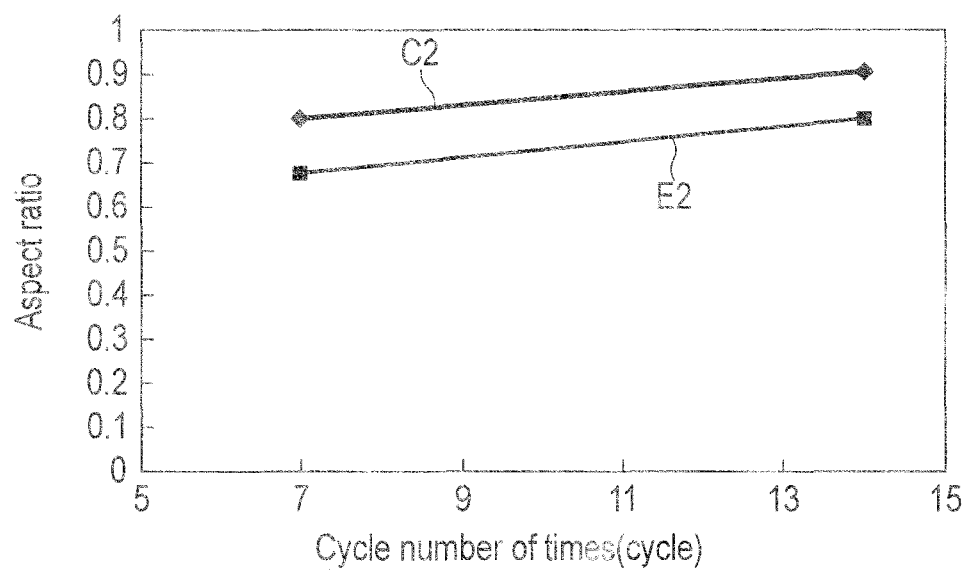
FIG. 3 is a characteristic diagrammatic view showing a correlation between the repetition cycle number and the pit aspect ratio as compared each example with each comparative example.

Further, according to the present invention, the shape of the corrosion pit occurred in the corrosive environment is flattened and the local stress concentration is hardly generated (FIG. 3).

Figure 4:
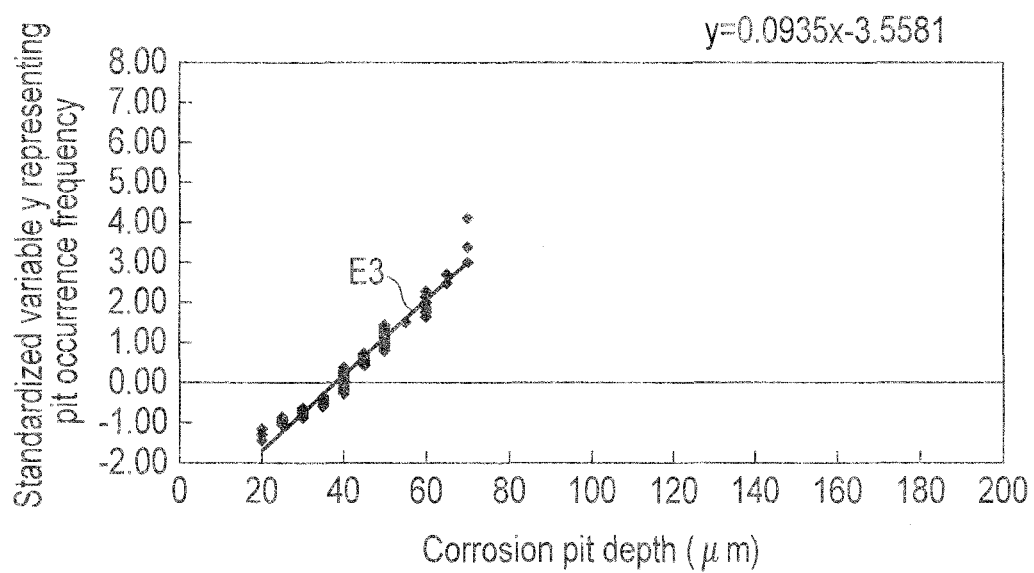
FIG. 4 is a characteristic diagrammatic view showing a correlation between the depth and generation frequency of the corrosion pit occurred in each sample of each example.
Figure 5:
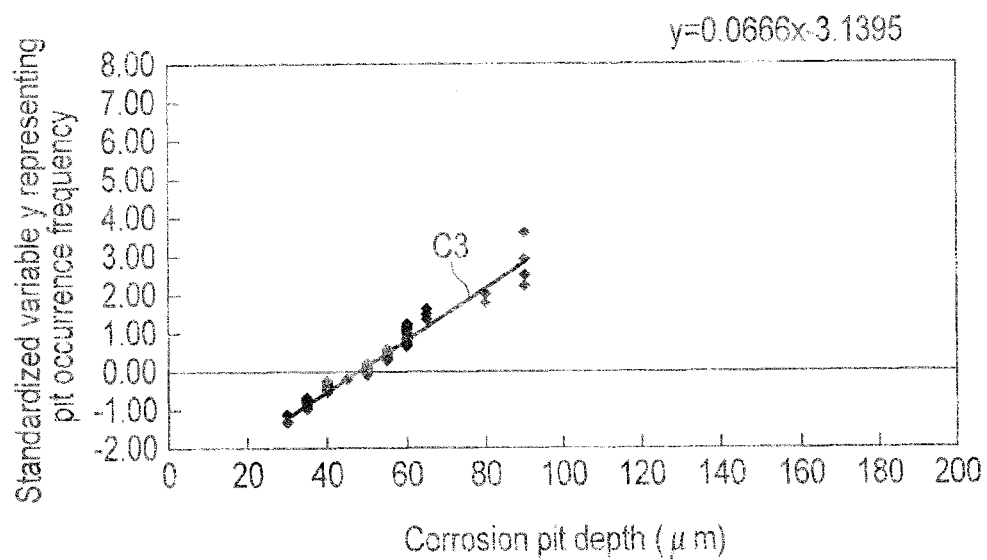
FIG. 5 is a characteristic diagrammatic view showing a correlation between the depth and generation frequency of the corrosion pit occurred in each sample of each comparative example.
Figure 6:
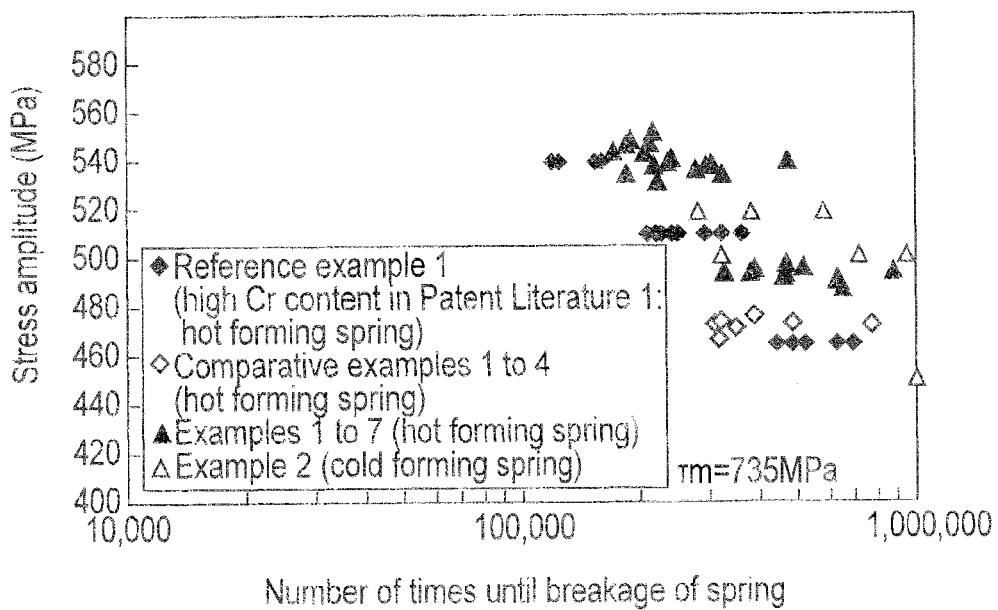
FIG. 6 is a characteristic diagrammatic view showing a correlation between the number of times that various kinds of coil springs are broken and the stress amplitude.

According to the present invention, the depth of the corrosion pit occurred in the corrosive environment is shallow. Thus, a fatigue crack is hardly formed and the corrosion lifetime is improved (FIGS. 4 to 6).

(2) The method for producing the high-strength spring of the present invention comprises: hot or cold working a steel which comprises C: 0.38 to 0.44%, Si: 2.00 to 2.30%, Mn: 0.79 to 1.25%, Cr: 0.10 to 0.43%, Ni: 0.15 to 0.35%, Cu: 0.15 to 0.35%, Ti: 0.05 to 0.13%, P: 0.02% or less (0% is not included), S: 0.02% or less (0% is not included), Al: 0.003 to 0.10%, N: 0.002 to 0.012%, O: 0.0002% or less (0% is not included), by mass %, and residue consisting of iron and inevitable impurities, wherein an $Ac_3$ transformation temperature as an indicator of the decarburization performance, which is calculated by Equation (1) below, is from 859 to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55, into a wire rod; rolling the wire rod to be formed into a desired coil spring shape; subjecting the spring to a heat treatment for hardening and tempering; hot-setting the spring; subjecting the spring to hot shot peening; and pre-setting the spring.

$$Ac_3 = 910 - 203 \times \sqrt{C} - 15.2Ni + 44.7Si + 104V + 31.5Mo + 13.1W \quad (1)$$

$$DI = D_0 \times f_{Si} \times f_{Mn} \times f_P \times f_S \times f_{Cu} \times f_{Ni} \times f_{Cr} \quad (2)$$

$$HRC = 38.99 + 17.48C + 2.55Si - 2.28Ni + 2.37Cr + 8.04Ti \quad (3)$$

wherein, $D_0 = 8.65 \times \sqrt{C}$, $f_{Si} = 1 + 0.64 \times \%$ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

The hot forming spring is produced through a series of the following processes: wire rod heating; rolling (forming into a coil spring shape); hardening; tempering; hot setting; hot shot peening; pre-setting; chemical conversion; and coating. On the other hand, the cold forming spring is produced through a series of the following processes: wire rod hardening and tempering; rolling; annealing to remove strain; hot setting; hot shot peening; pre-setting; chemical conversion; and coating.

According to the present invention, in spite of the material containing a reduced amount of expensive alloy elements, such as Ni, Cr, Mo, and V, in the steels within the range of the present invention, a decrease in the corrosion lifetime (corrosion durability) due to a difference in the composition ratio can be suppressed as compared with that of the conventional steel.

(3) In the process (2), the wire rod is rolled by hot or cold forming to be formed into the desired coil spring shape, and the spring is subjected to hot shot peening so as to give a maximum shear stress of 1176 MPa or more.

According to the present invention, the residual compressive stress remaining on the surface portion is increased by performing hot shot peening, and thus the maximum shear stress can be increased to a level of 1176 MPa or more. Although the maximum shear stress of the coil spring steel cannot be increased indefinitely, the upper limit is about 1400 MPa according to various manufacturing restrictions.

(4) In the process (2) or (3), it is preferable to perform the hot shot peening at 200° C. to 300° C.

When the temperature is less than 200° C., the effect of hot shot peening is not obtained or the effect becomes insufficient. On the other hand, when the temperature exceeds 300° C., reheating is needed or it is difficult to control the temperature.

(5) The high-strength spring of the present invention is produced by using any one of the methods (2) to (4). The high-strength spring of the present invention may be applied to either a coil spring produced by hot forming or a coil spring formed by cold forming.

Hereinafter, a preferred range of various composition elements, and the reason will be described.

(1) C: 0.38 to 0.44%

Carbon (C) is inevitably contained in steel, and contributes to the improvement in strength and hardness after hardening and tempering. From the viewpoint of ensuring a necessary strength, it is necessary to add 0.38% or more of the C content. More preferably, 0.39% or more of the C content is added. On the other hand, if the C content is too high, the aspect ratio of the corrosion pit is increased, the corrosion pit shape is sharpened, and the stress concentration to the corrosion pit is increased. Further, the toughness of the basis metal in steel is deteriorated, and thus the hydrogen embrittlement is also deteriorated. As a result, if the C content is excessive, the corrosion durability is deteriorated. Accordingly, the upper limit is set to 0.44%. More preferably, it is set to 0.43%.

(2) Si: 2.00 to 2.30%

Si contributes to the improvement in strength as a solid solution strengthening element and also improves the proof stress. Thus, if the Si content is too low, the strength of the basis metal becomes insufficient. Further, Si also has an effect of shifting the carbide precipitation temperature during tempering to the high temperature side and shifting the temper brittleness zone to the high temperature side to improve the hydrogen embrittlement. In order to obtain these effects, it is necessary to add 2.00% or more of the Si content. However, if the Si content is excessive, the decarburization is facilitated and the processability is worsened. Accordingly the upper limit is set to 2.30%. Preferably, it is set to 2.20%.

(3) Mn: 0.79 to 1.25%

Mn is an element that extends the austenite region in the equilibrium diagram and is effective in stably suppressing the ferrite decarburization. Mn has an effect of making S, which is a cause of the formation of inclusions, harmless. In order to obtain these effects, it is necessary to add 0.79% or more of the Mn content. However, if the Mn content is excessive, the toughness of the basis metal in steel is deteriorated. Thus, the hydrogen embrittlement is deteriorated. As a result, the corrosion durability is deteriorated. Accordingly, the upper limit is set to 1.25%. More preferably, the upper limit of the Mn content is set to 1.00%.

(4) Cr: 0.1 to 0.43%

Cr enhances the basis metal in steel by solid solution strengthening and also has an effect of improving the hardenability. In order to obtain these effects, it is necessary to add 0.10% or more of the Cr content. However, the corrosion durability of Cr is deteriorated by decreasing the PH value at the bottom of the corrosion pit to increase the aspect ratio of the corrosion pit (the pit shape is sharpened). Accordingly, the upper limit is set to 0.43%. More preferably, the upper limit of the Cr content is set to 0.30% or less.

(5) Ni: 0.15 to 0.35%

Ni has an effect of improving the corrosion resistance as is the case with Cu and an effect of increasing the amorphous composition of the rust and decreasing the aspect ratio of the corrosion pit. In order to obtain these effects, it is necessary to add 0.15% or more of the Ni content. However, if the Ni content is excessive, an increase in cost is caused. Accordingly, the upper limit is set to 0.35%. More preferably, the upper limit of the Ni content is set to 0.25% or less.

(6) Cu: 0.15 to 0.35%

Cu is a metallic element whose ionization tendency is electrochemically higher than that of iron and which has an effect of improving the corrosion resistance of steel. Further, Cu has an effect of increasing the amorphous composition of the rust generated during corrosion and suppressing a phenomenon in which chlorine (Cl) is condensed at the bottom of the corrosion pit, which is one of the causes for corrosion. The effect allows the aspect ratio of the corrosion pit to be controlled. Further, the stress concentration is relaxed, and the corrosion durability is improved. In order to obtain these effects, it is necessary to add 0.15% or more of the Cu content. However, if the Cu content is excessive, a crack due to hot-rolling may be formed. Accordingly, the upper limit is set to 0.35%. More preferably, the upper limit of the Cu content is set to 0.25%.

(7) Ti: 0.05 to 0.13%

Ti is effective in refining prior austenite crystal grains after hardening and tempering, and in improving the atmospheric durability and the hydrogen embrittlement. In order to obtain these effects, it is necessary to add 0.05% or more of (preferably 0.07% or more of) the Ti content. However, if the Ti content is excessive, coarse Ti nitrides precipitate and thus the fatigue characteristics are deteriorated. Accordingly, the upper limit is set to 0.13%. More preferably, the upper limit of the Ti content is set to 0.11%.

(8) Impurity Elements being Encouraged to Limit their Contents

Al, P, S, O, and N are impurity elements which enter into the steel in the process of forming the steel and they are encouraged to limit their contents. From the viewpoint of the performance of the spring and the capacity of the production facility, desired and permissible contents of these impurity elements are respectively specified as follows.

(8-1) Al: 0.003 to 0.10%

Al is an element that acts as a deoxidizer during the cast treatment. Al forms fine aluminium nitrides. Thus, it has an effect of refining crystal grains due to the pinning effect. In order to obtain these effects, it is necessary to add at least 0.003% or more of the Al content. More preferably, 0.005% or more of the Al content is added.

However, if the Al content is excessive, coarse aluminium nitrides (AlN) are formed, resulting in a bad influence on the fatigue characteristics. Accordingly, the upper limit is set to 0.10%. More preferably, the upper limit of the Al content is set to 0.03%.

(8-2) P: 0.02% or Less (0% is not Included)

P is an element which segregates at a prior austenite grain boundary to embrittle the grain boundary and deteriorates the fatigue characteristics. Therefore, the P content is preferred to be as little as possible and is preferably controlled to 0.02% or less. In order to obtain the fatigue characteristics at a high level, it is preferably controlled to 0.01% or less.

(8-3) S: 0.02% or Less (0% is not Included)

S is an element which segregates at a prior austenite grain boundary to embrittle the grain boundary and deteriorates the fatigue characteristics as is the case with P. Therefore, the S content is preferred to be as little as possible and is preferably controlled to 0.02% or less. In order to obtain the fatigue characteristics at a high level, it is preferably controlled to 0.01% or less.

(8-4) O: 0.002% or Less (0% is not Included)

Oxygen (O) is an element which forms an oxide-based inclusion and reduces the fatigue characteristics. If the 0 content becomes excessive, a coarse oxide-based inclusion such as alumina ($Al_2O_3$) is formed, the fatigue characteristics are significantly reduced. Therefore, the O content is preferred to be as little as possible. In order to obtain the fatigue characteristics at a normal level, it is preferably controlled to 0.002% or less.

(8-5) N: 0.002 to 0.012%

Nitrogen (N) forms nitrides with Al and contributes to the refinement of crystal grains. To accomplish this, it is necessary to add 0.002% or more of the N content. However, if the N content is excessive, N forms coarse nitrides with Ti and Al, an effect of preventing crystal grains from being coarsened is not obtained, and an TiN-based inclusion is formed. This causes a decrease in the fatigue characteristics. Accordingly, the upper limit of the N content is set to 0.012%. More preferably, the upper limit of the N content is set to 0.010%.

(9) $Ac_3$ Transformation Temperature

If the $Ac_3$ transformation temperature is set to a low value, the heating temperature may be low, which is advantageous for the decarburization. On the other hand, if the heating temperature is assumed to be the same, a permissible temperature until the hardening is completed can be set to a low value. Therefore, this is considered to be advantageous for the decarburization.

An case of the composition design of the example steel regarding the $Ac_3$ transformation temperature will be explained with reference to Table 1.

In the example steel, a basic composition design is performed using the composition of the existing high Cr steel as a base composition. Further, aiming at providing an optimal value of the $Ac_3$ temperature equal to that of the existing high Cr steel, a specific composition design is performed. That is, in the case of the optimal composition of the existing high Cr steel (C: 0.41%, Si: 1.75%, Ni: 0.5%, and V: 0.16%), the $Ac_3$ temperature is 867.3° C. Thus, the composition design of the example steel is examined while the spring performance (atmospheric durability, sag resistance, and corrosion durability), hardenability, and temper hardness are ensured so that the $Ac_3$ temperature is equal to at least that of the existing high Cr steel (while the maintenance of the performance level as the steel for high-strength spring is confirmed). As a result, in the case of the optimal composition of the example steel (C: 0.415%, Si: 2.05%, Ni: 0.2%, and no-addition of V), the $Ac_3$ temperature is 867.8° C. In the example steel, the decarburization performance substantially equal to that of the existing high Cr steel can be obtained even under conditions (no-addition of V and the low Ni content). The "optimal value" used herein means an ideal composition for compositions which provides excellent spring characteristics in an interval from a minimum value to a maximum value in the $Ac_3$ temperature. The optimal value does not necessarily correspond a center value (arithmetic average) between the minimum and maximum values. The optimal value is a value slightly lower than an arithmetic average of the minimum and maximum values in many cases.

Thus, the $Ac_3$ temperature is an important factor used as an indicator of the decarburization performance of steel. The $Ac_3$ temperature is expressed by Equation (1) below, wherein each element symbol in the equation represents the content of the element (mass %).

$$Ac_3=910-203\times\sqrt{C}-15.2Ni+44.7Si+104V+31.5Mo+13.1W \quad (1)$$

An example of the composition design of the example steel when the $Ac_3$ temperature is 859° C. is as follows: C: 0.44%, Si: 2.0%, Ni: 0.35%, and no-addition of V. An example of the composition design of the example steel when the $Ac_3$ temperature is 885° C. is as follows: C: 0.38%, Si: 2.3%, Ni: 0.15%, and no-addition of V.

An example of the optimal composition design of the example steel when the $Ac_3$ temperature is 867° C. is as follows: C: 0.415%, Si: 2.05%, Ni: 0.20%, and no-addition of V.

On the other hand, as for existing high Cr steel, an example of the composition design of the existing high Cr steel when the $Ac_3$ temperature is 861° C. is as follows: C: 0.42%, Si: 1.70%, Ni: 0.6%, and V: 0.15%. An example of the composition design of the existing high Cr steel when the $Ac_3$ temperature is 886° C. is as follows: C: 0.38%, Si: 1.90%, Ni: 0.3%, and V: 0.20%. An example of the composition design of the existing high Cr steel when the $Ac_3$ temperature is 867.3° C. is as follows: C: 0.41%, Si: 1.75%, Ni: 0.5%, and V: 0.16%.

TABLE 1

Calculated cases of the composition design regarding the $Ac_3$ transformation temperature

| Classification | Application of composition addition to $Ac_3$ temperature | C | Si | Ni | V | $Ac_3$ transformation temperature (° C.) |
|---|---|---|---|---|---|---|
| Example steel | Minimum | 0.44 | 2.0 | 0.35 | 0 | 859 |
| Example steel | Maximum | 0.38 | 2.3 | 0.15 | 0 | 885 |
| Example steel | Optimal | 0.415 | 2.05 | 0.2 | 0 | 867.8 |
| Existing high Cr steel | Minimum | 0.42 | 1.7 | 0.6 | 0.15 | 861 |
| Existing high Cr steel | Maximum | 0.38 | 1.9 | 0.3 | 0.2 | 886 |
| Existing high Cr steel | Optimal | 0.41 | 1.75 | 0.5 | 0.16 | 867.3 |

(10) Hardenability

The spring hardness is an important factor which influences the spring performance. It is important to obtain uniform hardness regardless of the wire diameter or size of the spring. Therefore, it is necessary to perform an examination, taking into consideration the hardenability. In order to evaluate the hardenability, a maximum diameter DI when a round bar is subjected to water hardening and 50% or more of the center section can be martensitically transformed is used.

An cases of the composition design of the example steels regarding the hardenability will be explained with reference to Table 2.

In the example steel, a basic composition design is performed using the composition of the existing high Cr steel as a base composition. Further, aiming at providing an optimal value of the maximum diameter DI equal to that of the existing high Cr steel, a specific composition design is performed. That is, the maximum diameter DI is determined using the equation of H. Hollomon & L. D. Jaffe, which is expressed by Equation (2) below:

$$DI=D_O\times f_{Si}\times f_{Mn}\times f_P\times f_S\times f_{Cu}\times f_{Ni}\times f_{Cr} \quad (2)$$

wherein $DO=8.65\times\sqrt{C}$, $fSi=1+0.64\times\%$ Si, $fMn=1+4.10\times\%$ Mn, $fP=1+2.83\times\%$ P, $fS=1-0.62\times\%$ S, $fCu=1+0.27\times\%$ Cu, $fNi=1+0.52\times\%$ Ni, and $fCr=1+2.33\times\%$ Cr.

In the embodiment, it is preferable to perform the composition design so that the maximum diameter DI specified by Equation (2) above is from 70 to 238 mm. If the DI value is less than 70 mm, it is impossible to achieve a desired hardening effect which is required for the coil spring. On the other hand, if the DI value exceeds 238 mm, a crack may occur during hardening.

An case of the composition design of the example steel when the maximum diameter DI is 70 mm is as follows: C: 0.38%, Si: 2.0%, Mn: 0.79%, P: 0%, S: 0%, Cr: 0.1%, Ni: 0.15%, Cu: 0.15%, and no-addition of V. An example of the composition design of the example steel when the maximum diameter DI is 238 mm is as follows: C: 0.44%, Si: 2.3%, Mn: 1.25%, P: 0.02%, S: 0.02%, Cr: 0.43%, Ni: 0.35%, Cu: 0.35%, and no-addition of V.

Further, it is the most preferable that the maximum diameter DI is set to a range of 115±10 mm (105 to 125 mm), aiming at 115 mm which is an optimal value of the maximum diameter DI. An example of the composition design of the example steel when the maximum diameter DI is 115 mm is as follows: C: 0.415%, Si: 2.05%, Mn: 1.00%, P: 0.009%, S: 0.006%, Cr: 0.2%, Ni: 0.2%, Cu: 0.2%, and no-addition of V.

On the other hand, as for existing high Cr steel (conventional steel), an example of the composition design of the existing high Cr steel when the maximum diameter DI is 63 mm is as follows: C: 0.38%, Si: 1.7%, Mn: 0.1%, P: 0%, S: 0%, Cr: 1.0%, Ni: 0.3%, and Cu: 0.2%. An example of the composition design of the existing high Cr steel when the maximum diameter DI is 189 mm is as follows: C: 0.42%, Si: 1.9%, Mn: 0.45%, P: 0.02%, S: 0.02%, Cr: 1.1%, Ni: 0.6%, and Cu: 0.3%. An example of the optimal composition design of the existing high Cr steel when the maximum diameter DI is 95 mm is as follows: C: 0.41%, Si: 1.75%, Mn: 0.18%, P: 0.009%, S: 0.006%, Cr: 1.04%, Ni: 0.5%, and Cu: 0.22%.

value of the temper hardness HRC equal to that of the existing high Cr steel (conventional steel), a specific composition design is performed.

The temper hardness of the existing high Cr steel at a certain tempering temperature T° C. is 52.5 HRC in the case of the optimal composition. On the other hand, in the case of the optimal composition in the example steel, the temper hardness at the tempering temperature T° C. is 52.6 HRC. As described above, the contents of C, Si, Ni, Cr, and Ti are respectively adjusted so that the same temper hardness is obtained using the optimal composition.

In the present invention, the temper hardness is preferably from 48 to 58 HRC, particularly most preferably from 50 to 56 HRC. If the temper hardness is less than 48 HRC, desired mechanical characteristics which are required for the coil

TABLE 2

Calculated cases of the composition design regarding the estimation index DI of hardenability

| Classification | Application of composition addition to DI value | Composition | | | | | | | | DI value (mm) |
|---|---|---|---|---|---|---|---|---|---|---|
| | | C | Si | Mn | P | S | Cr | Ni | Cu | |
| Example steel | Minimum | 0.38 | 2.0 | 0.79 | 0 | 0 | 0.1 | 0.15 | 0.15 | 70 |
| Example steel | Maximum | 0.44 | 2.3 | 1.25 | 0.02 | 0.02 | 0.43 | 0.35 | 0.35 | 238 |
| Example steel | Optimal | 0.415 | 2.05 | 1 | 0.009 | 0.006 | 0.2 | 0.2 | 0.2 | 115 |
| Existing high Cr steel | Minimum | 0.38 | 1.7 | 0.1 | 0 | 0 | 1.0 | 0.3 | 0.2 | 63 |
| Existing high Cr steel | Maximum | 0.42 | 1.9 | 0.45 | 0.02 | 0.02 | 1.1 | 0.6 | 0.3 | 189 |
| Existing high Cr steel | Optimal | 0.41 | 1.75 | 0.18 | 0.009 | 0.006 | 1.04 | 0.5 | 0.22 | 95 |

(11) Temper Hardness

The temper hardness is the final hardness of the spring and has a large impact on the spring performance. If the same hardness can be obtained at the same tempering temperature as that of the existing high Cr steel, it is possible to produce the spring without changing the tempering temperature. Consequently, it is an important factor, taking into consideration the productivity of the spring.

The temper hardness of steel is evaluated using a Rockwell C scale (HRC). A temper hardness HRC is expressed by Equation (3) below:

$$HRC = 38.99 + 17.48C + 2.55Si - 2.28Ni + 2.37Cr + 8.04Ti \quad (3)$$

Equation (3) above is a regression equation (empirical formula) which is obtained by performing a multivariate analysis on the results of different types of steels subjected to the test in the past. The composition of the steel is not determined according to only the temper hardness. The composition of the steel is adjusted so as to comprehensively satisfy the corrosion durability, sag resistance, $Ac_3$ transformation temperature, decarburization, and the like.

An cases of the composition design of the example steels regarding the hardenability will be explained with reference to Table 3.

In the example steel, a basic composition design is performed using the composition of the existing high Cr steel as a base composition. Further, aiming at providing an optimal spring are not obtained, and thus the spring is easily sagged. On the other hand, if the temper hardness exceeds 58 HRC, the spring is adversely affected when a crack is formed on the surface of the spring. As a result, the durability is reduced.

An example of the composition design of the example steel when the temper hardness is 54.3 HRC is as follows: C: 0.44%, Si: 2.3%, Ni: 0.35%, Cr: 0.43%, and Ti: 0.13%. An example of the composition design of the example steel when the temper hardness is 50.6 HRC is as follows: C: 0.38%, Si: 2.0%, Ni: 0.15%, Cr: 0.10%, and Ti: 0.05%.

Further, aiming at HRC 52.6 which is an optimal value of the temper hardness, an example of the composition design of the example steel is as follows: C: 0.415%, Si: 2.05%, Ni: 0.20%, Cr: 0.38%, and Ti: 0.09%.

On the other hand, as for existing high Cr steel (conventional steel), an example of the composition design of the existing high Cr steel when the temper hardness is 51.4 HRC is as follows: C: 0.38%, Si: 1.7%, Ni: 0.60%, Cr: 1.00%, and Ti: 0.05%. An example of the composition design of the existing high Cr steel when the temper hardness is 53.8 HRC is as follows: C, 0.42%, Si: 1.9%, Ni: 0.30%, Cr: 1.10%, and Ti: 0.09%. Further, aiming at HRC 52.5 which is an optimal value of the temper hardness, an example of the composition design of the existing high Cr steel is as follows: C, 0.41%, Si: 1.75%, Ni: 0.50%, Cr: 1.05%, and Ti: 0.07%.

TABLE 3

Calculated cases of the composition design regarding the temper hardness HRC

| Classification | Application to the tempering hardness | Composition | | | | | Tempering hardness |
|---|---|---|---|---|---|---|---|
| | | C | Si | Ni | Cr | Ti | |
| Example steel | Minimum | 0.38 | 2.0 | 0.35 | 0.10 | 0.05 | 50.6 |
| Example steel | Maximum | 0.44 | 2.3 | 0.15 | 0.43 | 0.13 | 54.3 |
| Example steel | Optimal | 0.415 | 2.05 | 0.2 | 0.38 | 0.09 | 52.6 |

TABLE 3-continued

Calculated cases of the composition design regarding the temper hardness HRC

| Classification | Application to the tempering hardness | Composition | | | | | Tempering hardness |
| --- | --- | --- | --- | --- | --- | --- | --- |
| | | C | Si | Ni | Cr | Ti | |
| Existing high Cr steel | Minimum | 0.38 | 1.7 | 0.6 | 1.0 | 0.05 | 51.4 |
| Existing high Cr steel | Maximum | 0.42 | 1.9 | 0.3 | 1.1 | 0.09 | 53.8 |
| Existing high Cr steel | Optimal | 0.41 | 1.75 | 0.5 | 1.05 | 0.07 | 52.5 |

(12) Corrosion Weight Loss

The corrosion weight loss is one of the criteria to evaluate the durability to the general corrosion of the material. Usually, the general corrosion and the generation frequency of the corrosion pit have a trade-off relationship, such that when the general corrosion (corrosion weight loss) of the metallic material is high, the generation frequency of the corrosion pit (pitting) is low, when the general corrosion (corrosion weight loss) is low, the generation frequency of the corrosion pit (pitting) is high. For example, the addition of Cr acts positively on the general corrosion, however it acts negatively on the corrosion pit (pitting).

(13) Generation Frequency and Depth of Corrosion Pit

The generation frequency of the corrosion pit is evaluated using a standardized variable y. The examined results of a relationship between the generation frequency and depth of the corrosion pit regarding the example steel and the existing high Cr steel are shown in FIGS. 4 and 5 as will hereinafter be described. Here, the term "standardized variable y" means a variable calculated by a method using a Gumbel distribution function, which is among extreme value statistical methods being used to evaluate the inclusions in the metallic material (statistical methods using the cumulative distribution function or a Gumbel distribution function). The calculated standardized variables y are sequentially written in an extreme value statistical graph and thus the slope of a group of plotted points in the extreme value statistical graph is determined. The generation frequency (in this embodiment, the generation frequency of the corrosion pit in place of the inclusions) can be understood from the slope. In this regard, the procedure of the extreme value statistical method using the standardized variable y of the Gumbel distribution is particularly described in "Metal Fatigue: Effects of Small Defects and Nonmetallic Inclusions; written by Yukitaka Murakami; published by Yokendo Co., Ltd.; appendix A, p. 233 to 239".

A mechanism in which the corrosion pit is generated and then the crack is formed will be explained with reference to FIG. 1.

If a local electrochemical reaction is generated by highly corrosive solute ions which are condensed on the surface of the steel forming the spring, a small hollow-shaped corrosion pit, as shown in (a) of FIG. 1, is generated. If the initial corrosion pit grows and deepens as shown in (b) of FIG. 1, local stress concentration is generated at the bottom of the pit and a small crack is formed as shown in (c) of FIG. 1. Then, the crack is progressed by repetitive stress as shown in (d) of FIG. 1, and the spring is finally fractured.

Delaying the generation and growth of the pit which is caused by corrosion or controlling the shape results in delaying the formation of the crack at the bottom of the pit. As a result, the corrosion fatigue lifetime becomes longer.

The width of the corrosion pit can be measured within the observation field of a metallographic microscope.

Further, the depth of the corrosion pit can be measured within the observation field of the metallographic microscope.

The shape of the pit can be determined using the measured depth and width of the corrosion pit.

(14) Atmospheric Durability

The atmospheric durability when the spring material is exposed to the air is also one of the important evaluation items. The atmospheric durability test is performed by repeatedly applying a load in the direction of compression until the spring is fractured (broken) in the air. As the number of the repeated cycles until the spring is broken is large, the material is evaluated as a material having excellent atmospheric durability.

(15) Sag Resistance

The sag resistance is an important evaluation item for spring materials. The sag resistance of a coil spring is measured by the tightening test which applies a compressive load to the spring. The tightening test measures how far the shape of the spring is recovered to the original shape when the spring is placed under predetermined conditions (the compressive load, time, and temperature), and the load is deactivated and evaluates the result.

(16) Corrosion Durability Test

The corrosion durability test is a test in which a cycle (salt spray test, fatigue test, and keeping in a constant temperature and humidity chamber) per day is performed until a coil spring without coating is broken (fractured). In the salt spray test, a 5% NaCl aqueous solution is sprayed to the coil spring without coating for 30 minutes (in accordance with JIS Z2371). In the fatigue test, the coil spring without coating is vibrated 3000 times (repeating alternate load). The constant temperature and humidity chamber is a container for keeping the spring after the fatigue test at room temperature (23 to 25° C.) and relative humidity of 50 to 60% for 23 hours. After being kept in the constant temperature and humidity chamber, the coil spring is again subjected to the salt spray test.

(17) Method for Producing Spring

The present invention can be applied to hot- and cold-formed coil springs.

The hot-formed coil spring is produced through the following process: wire rod heating (high-frequency heating); rolling (forming into a coil spring shape); hardening (oil hardening); tempering; hot setting; hot shot peening; water cooling; pre-setting; chemical conversion; and coating.

The cold-formed coil spring is produced through the following process:

wire rod hardening and tempering; rolling (forming into a coil spring shape); annealing to remove strain; hot setting; hot shot peening; pre-setting; chemical conversion; and coating.

EXAMPLES

Hereinafter, the present invention will be specifically described while comparing comparative examples with reference examples, citing examples with reference to the attached drawings and tables. However, the present invention is not limited only to the following examples, and various modification may be added within the scope that fulfills the object and purpose of the present invention.

The hot- and cold-formed coil springs shown in Table 6 were produced using the steels of Comparative examples 1 to 4 (steels A to D), Examples 1 to 7 (steels E to K), and Reference examples 1 and 2 (steels L and M) having the compositions shown in Tables 4 and 5. Here, the steels A to D of the comparative examples were obtained by reproducing the conventional steels having the composition ratios described in Patent Literature 2. The steels L and M of the reference examples were obtained by reproducing the existing high Cr steels of the composition ratios described in Patent Literature 1.

The hot coil spring was produced by a hot working process including the following: wire rod heating (high-frequency heating or furnace heating at 980° C. or more); rolling (forming into a coil spring shape); hardening (oil hardening); tempering (at about 390° C.); hot setting; hot shot peening; water cooling; pre-setting; chemical conversion; and coating.

The cold-formed coil spring was produced by a cold working process including the following: wire rod hardening and tempering; rolling (forming into a coil spring shape); annealing to remove strain (at about 380° C.); hot setting; hot shot peening; pre-setting; chemical conversion; and coating.

In the hot setting, the spring was pushed until a stress of 1300 MPa occurred at 250° C. so as to plastically deform the spring.

In the pre-setting, the spring was pushed until a stress of 1300 MPa occurred at room temperature so as to plastically deform the spring.

As the chemical conversion, treatment for forming a zinc phosphate coat was performed.

As the coating, electrostatic coating was performed.

The three parameters Ceq 1, Ceq 2, and Ceq 3 in Table 5 are parameters for specifying the conventional steels described in Patent Literature 2, which are obtained using Equations (4), (5), and (6) below.

$$Ceq1 = [C] + 0.11[Si] - 0.07 - [Mn] - 0.05 - [Ni] + 0.02[Cr] \quad (4)$$

$$Ceq2 = [C] + 0.30[Cr] - 0.15[Ni] - 0.70[Cu] \quad (5)$$

$$Ceq3 = [C] - 0.04[Si] + 0.24[Mn] + 0.10[Ni] + 0.20[Cr] - 0.89[Ti] - 1.92[Nb] \quad (6)$$

TABLE 4

| Classification | Steel type | Component (mass %) | | | | | | | | | | N (ppm) | O (ppm) |
|---|---|---|---|---|---|---|---|---|---|---|---|---|---|
| | | C | Si | Mn | Cu | Ni | Cr | Ti | Al | P | S | | |
| Comparative Example 1 | A | 0.41 | 2.18 | 0.79 | — | — | 0.21 | 0.071 | 0.1≥ | 0.02≥ | 0.02≥ | 70 | 8 |
| Comparative Example 2 | B | 0.41 | 2.18 | 0.77 | 0.16 | 0.20 | — | 0.069 | 0.1≥ | 0.02≥ | 0.02≥ | 70 | 8 |
| Comparative Example 3 | C | 0.41 | 2.20 | 0.81 | — | 0.30 | 0.21 | 0.072 | 0.1≥ | 0.02≥ | 0.02≥ | 70 | 8 |
| Comparative Example 4 | D | 0.40 | 2.19 | 0.78 | 0.31 | 0.20 | 0.20 | 0.072 | 0.1≥ | 0.02≥ | 0.02≥ | 20 | 5 |
| Example 1 | E | 0.42 | 2.22 | 1.22 | 0.25 | 0.25 | 0.19 | 0.095 | 0.035 | 0.02≥ | 0.02≥ | 70 | 8 |
| Example 2 | F | 0.41 | 2.10 | 1.04 | 0.25 | 0.26 | 0.40 | 0.090 | 0.035 | 0.02≥ | 0.02≥ | 70 | 8 |
| Example 3 | G | 0.40 | 2.15 | 1.00 | 0.22 | 0.24 | 0.38 | 0.098 | 0.035 | 0.02≥ | 0.02≥ | 70 | 8 |
| Example 4 | H | 0.41 | 2.09 | 0.99 | 0.24 | 0.24 | 0.37 | 0.097 | 0.035 | 0.02≥ | 0.02≥ | 70 | 8 |
| Example 5 | I | 0.42 | 2.19 | 0.99 | 0.23 | 0.25 | 0.19 | 0.091 | 0.035 | 0.02≥ | 0.02≥ | 70 | 8 |
| Example 6 | J | 0.43 | 2.20 | 1.21 | 0.25 | 0.25 | 0.20 | 0.095 | 0.035 | 0.02≥ | 0.02≥ | 70 | 8 |
| Example 7 | K | 0.41 | 2.10 | 1.04 | 0.25 | 0.26 | 0.40 | 0.090 | 0.035 | 0.02≥ | 0.02≥ | 70 | 8 |
| Reference Example 1 | L | 0.41 | 1.75 | 0.18 | 0.25 | 0.45 | 1.05 | 0.063 | 0.035 | 0.02≥ | 0.02≥ | 70 | 8 |

TABLE 5

| Classification | Steel type | Corrosion life (%) | Ceq 1 | Ceq 2 | Ceq 3 |
|---|---|---|---|---|---|
| Comparative Example 1 | A | 83 | 0.599 | 0.473 | 0.491 |
| Comparative Example 2 | B | 86 | 0.586 | 0.268 | 0.466 |
| Comparative Example 3 | C | 86.7 | 0.585 | 0.428 | 0.524 |
| Comparative Example 4 | D | 92 | 0.580 | 0.213 | 0.496 |
| Example 1 | E | 102 | — | — | — |
| Example 2 | F | 106 | — | — | — |
| Example 3 | G | 106 | — | — | — |
| Example 4 | H | 101 | — | — | — |
| Example 5 | I | 105 | — | — | — |
| Example 6 | J | 107 | — | — | — |
| Example 7 | K | 106 | — | — | — |
| Reference Example 1 | L | 100 | — | — | — |

TABLE 6

| Type of working | Wire diameter (mm) | Average diameter (mm) | Free length (mm) | Effective coil turn number | Spring constant (N/mm) |
|---|---|---|---|---|---|
| Hot working | 12.5 | 110.0 | 382.0 | 5.39 | 33.3 |
| Cold working | 10.8 | 108.3 | 380.5 | 4.69 | 22.4 |

These coil springs were evaluated using various kinds of the following tests.

[Corrosion Weight Loss Test]

Combined Cyclic Corrosion Test Mode

A cycle of spraying salt water (at 35° C., 5% NaCl) to the springs for 8 hours and keeping them at a constant temperature and a constant humidity (at 35° C. and 60 R.H.) for 16 hours was performed 14 times.

Test piece shape: ϕ: 10 mm, length: 100 mm

Specimen hardness: 53.5 HRC

After 7 and 14 cycles, the weight and the corrosion pit shape were measured with a microscope and the results were structured.

Test Results:

The relationship between the cycle number and the corrosion weight loss as to the springs of the examples and the springs of the comparative examples was examined and the results were shown in FIG. 2. The results of the examples were shown with a characteristic line E1, while the results of the comparative examples were shown with a characteristic line C1.

As is clear from these results, it is confirmed that the examples have corrosion resistance not inferior to that of the comparative examples to which a large amount of the alloy elements are added.

[Evaluation Test of Corrosion Pit Shape]

The shape of the corrosion pit can be specified by an aspect ratio which is determined by performing the following corrosion test.

A round bar was heated at 960° C. for 10 minutes, cooled with oil at 70° C. for oil-hardening, and heated at 340° C. for 60 minutes for tempering. Then, the round bar was cut to have a diameter of 10 to 12.5 mm.

5 mass % of NaCl aqueous solution was sprayed to the test piece at 35° C. for 8 hours in accordance with JIS Z 2371. Thereafter, a cycle of keeping the test piece in a wet environment (at a humidity of 60% and a temperature of 35° C.) for 16 hours was 14 times.

The test piece was immersed in a predetermined rust removing liquid at normal temperature to remove the rust generated by the salt water spraying. Subsequently, corrosion pits of the surface of the test piece were observed with a laser microscope. 20 or more corrosion pits are selected from the corrosion pits observed in the surface of the test piece in increasing order of depth. The aspect ratios of the corrosion pits were calculated by Equation (7) below.

$$\text{Aspect ratio} = (\text{corrosion pit depth} \times 2)/(\text{corrosion pit width}) \quad (7)$$

In the case of ferrous materials, the aspect ratio of the corrosion pit is usually around 1.0.

Test Results:

The relationship between the cycle number and the aspect ratio of the corrosion pit as to the examples and the comparative examples was examined and the results were shown in FIG. 3. In the drawing, the results of the examples were shown with a characteristic line E2 and the results of the comparative examples were shown with a characteristic line C2.

As is clear from these results, it is confirmed that the aspect ratios of the corrosion pits in the examples are lower than those of the comparative examples, and the shape of the corrosion pits is flat as compared with that of the comparative examples. This result is considered to show that an effect of suppressing pitting is exerted by the low Cr content in the examples. This is because Cr is an element in which the pH of the bottom of the corrosion pit (the distal end) is generally decreased during the formation of hydroxides as compared with Fe, and pitting is easily facilitated.

The relationship between the corrosion pit depth and the generation frequency as to the examples and the comparative examples was examined and the results were shown in FIGS. 4 and 5. The generation frequency of a corrosion pit was evaluated using the standardized variable y. The results of the examples were shown with a characteristic line E3 in FIG. 4. The results of the comparative examples were shown with a characteristic line C3 in FIG. 5.

As is clear by comparing both the drawings, the slope of the characteristic line E3 of the examples is higher than that of the characteristic line C3 of the comparative examples. This shows that the generation frequency of a shallow corrosion pit increases in the examples, while the generation frequency of a deep corrosion pit increases in the comparative examples.

In other words, the generation frequency of a deep corrosion pit is low in the examples.

[Spring Hardness]

51.5 HRC (2.75 HBD): for the atmospheric durability test, for the tightening test 53.5 HRC (2.65 HBD): for the corrosion durability test The conventional steel and the example steel were refined to the same hardness. The spring performance of conventional steel was relatively compared with that of the example steel.

[Evaluation of Hardenability]

The hardening performance of the steel was evaluated using the DI value.

The DI value in the case of the optimal composition of the comparative example was 95 mm in Grain size No. 7. On the other hand, the DI value in the case of the optimal composition of the example was 115 mm in Grain size No. 7. From the result, it is confirmed that even if the Ni content is low in the examples, hardenability equal or superior to that of the comparative examples can be ensured while desired spring performance, decarburization, and temper hardness are respectively satisfied.

[Air Durability Test]

Tests of changing average and variable loads were performed and an average shearing stress τm of the resultant shearing stresses was converted at 735 MPa. The results are shown in FIG. 6. In the drawing, Reference example 1 is indicated by a black rhombus plot, the comparative examples are indicated by white rhombus plots, and the examples are indicated by triangular plots.

As is clear from these results, it is confirmed that the atmospheric lifetimes of the cold- and hot forming springs in the examples are equal or longer than those in the comparative examples.

[Tightening Test]
Conditions for Tightening Test
Test stress (maximum shear stress): 1176 MPa, 1225 MPa, and 1274 MPa
Tightening temperature and time: at 80° C. for 96 hours
Sag resistance (residual shearing strain γ):
γ=8D/πGd3−(P1−P2)

Figure 7:
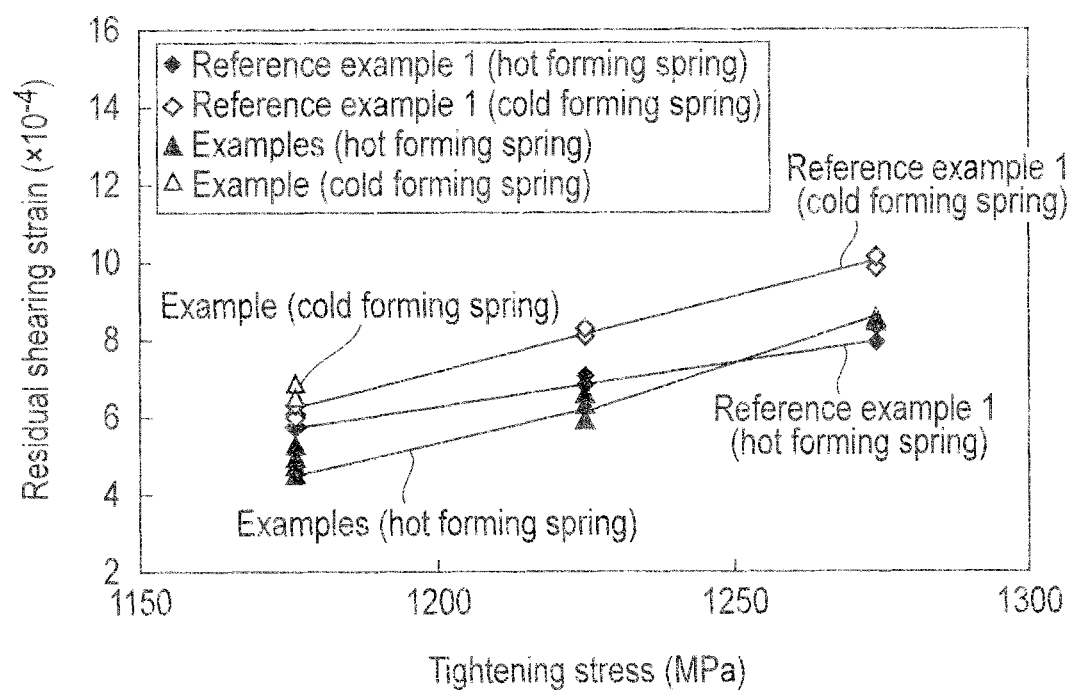
FIG. 7 is a characteristic diagrammatic view showing a correlation between the tightening stress and residual shearing strain of various kinds of coil springs.

The test results showing the sag resistance of spring are shown in FIG. 7. In the drawing, the results in Reference example 1 were indicated by rhombus plots and the results in the examples were indicated by triangular plots.

From these results, the sag resistance in the examples was nearly equal to that in Reference example 1. The sag resistance of the hot forming spring was slightly higher than that of the cold forming spring. The same holds for the results in the examples and Reference example 1.

[Corrosion Durability Test]

The corrosion durability test is performed using the coil spring without coating and thus its object is to evaluate the performance of the material itself and the performance by the process of producing the spring. As described above, the corrosion durability test is a test in which a cycle (salt spray test, fatigue test, and keeping in a constant temperature and humidity chamber) per day is performed until a coil spring is broken, and then the number of the repeated cycles is evaluated as the corrosion lifetime. The corrosion lifetime is expressed in percentage using Reference example 1 as a standard value (100%) for relative comparison with the standard value.

The corrosion durability test results as to the steels of the examples, the comparative examples, and the reference examples were shown in Table 5. From these test results, it is confirmed that the corrosion durability of the steels of the examples is equal to or higher than that of the existing high Cr steels of the reference examples, and the hot- and cold forming springs do not include steels having a low corrosion lifetime, like the conventional steels of the comparative examples.

Basic advantages of the present invention will be enumerated as follows:
(i) in the composition ratio defined by the three parameters $Ac_3$, DI, and HRC, the corrosion lifetime is long and the strength is high;
(ii) the material cost is inexpensive;
(iii) it is hardly affected by the price fluctuation of the rare metal market and a material supply system becomes stable; and
(iv) it is saving resources.

According to the present invention, the spring performance which is equal or not inferior to that of the conventional steels is obtained despite that the additive amount of expensive alloy elements such as Ni, Cr, Mo, and V is equal to or lower than that of the conventional steels. Additionally, steels having the compositions whose corrosion lifetime is inferior are not included.

The springs were evaluated using the example steel. As the test results, in the composition ratio defined by the three parameters $Ac_3$, DI, and HRC, the atmospheric durability, sag resistance, and anti-corrosion durability were equal to or higher than those of the conventional steels.

Advantages in the performance of the present invention will be enumerated as follows:
(a) in spite of the small additive amount of alloy elements, such as Ni, Cr, Mo, and V, the corrosion weight loss in the corrosive environment becomes nearly equal to or lower than that of the conventional steel;
(b) the shape of the corrosion pit occurred in the corrosive environment is flat and the local stress concentration is hardly generated;
(c) the depth of the corrosion pit occurred in the corrosive environment is shallow, and thus a fatigue crack is hardly formed and the corrosion lifetime is improved; and
(d) the present invention can be applied to both the hot forming spring and the cold forming spring.

As described above, the corrosion weight loss of the example steel is nearly equal to or lower than that of the conventional steels in spite of the condition (no-addition of V and the low Ni content, and the low Cr content). The corrosion weight loss is not increased with changes in the composition ratio. The corrosion pit shape of the example steel is flat and the corrosion pit depth becomes shallow.

What is claimed is:

1. A steel for a spring for a vehicle comprising: C: 0.38 to 0.44%, Si: 2.00 to 2.30%, Mn: 0.99 to 1.25%, Cr: 0.10 to 0.43%, Ni: 0.15 to 0.35%, Cu: 0.15 to 0.35%, Ti: 0.09 to 0.13%, P: 0.02% or less (0% is not included), S: 0.02% or less (0% is not included), Al: 0.003 to 0.10%, N: 0.002 to 0.012%, O: 0.002% or less (0% is not included), by mass %, and the remainder consisting of iron and inevitable impurities, wherein an $Ac_3$ transformation temperature as an indicator of the decarburization performance, which is calculated by Equation (1) below, is from 859° C. to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55, $$Ac_3 = 910 - 203 \times \sqrt{C} - 15.2Ni + 44.7Si + 104V + 31.5Mo + 13.1W \quad (1),$$

$$DI = D_O \times f_{Si} \times f_{Mn} \times f_P \times f_S \times f_{Cu} \times f_{Ni} \times f_{Cr} \quad (2),$$

$$HRC = 38.99 + 17.48C + 2.55Si - 2.28Ni + 2.37Cr + 8.04Ti \quad (3),$$

wherein $D_O = 8.65 \times \sqrt{C}$, $f_{Si} = 1 + 0.64 \times \%$ Si, $f_{Mn} = 1 + 4.10 \times \%$ Mn, $f_P = 1 + 2.83 \times \%$ P, $f_S = 1 - 0.62 \times \%$ S, $f_{Cu} = 1 + 0.27 \times \%$ Cu, $f_{Ni} = 1 + 0.52 \times \%$ Ni, and $f_{Cr} = 1 + 2.33 \times \%$ Cr.

2. A method for producing a spring for a vehicle comprising:
hot or cold working a steel which comprises C: 0.38 to 0.44%, Si: 2.00 to 2.30%, Mn: 0.99 to 1.25%, Cr: 0.10 to 0.43%, Ni: 0.15 to 0.35%, Cu: 0.15 to 0.35%, Ti: 0.09 to 0.13%, P: 0.02% or less (0% is not included), S: 0.02% or less (0% is not included), Al: 0.003 to 0.10%, N: 0.002 to 0.012%, O: 0.002% or less (0% is not included), by mass %, and residue consisting of iron and inevitable impurities, wherein an $Ac_3$ transformation temperature as an indicator of the decarburization performance, which is calculated by Equation (1) below, is from 859° C. to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55, into a wire rod;
rolling the wire rod to be formed into a coil spring shape;
subjecting the spring to a heat treatment for hardening and tempering;
hot-setting the spring;
subjecting the spring to hot shot peening; and
pre-setting the spring, $$Ac_3 = 910 - 203 \times \sqrt{C} - 15.2Ni + 44.7Si + 104V + 31.5Mo + 13.1W \quad (1),$$

$$DI = D_O \times f_{Si} \times f_{Mn} \times f_P \times f_S \times f_{Cu} \times f_{Ni} \times f_{Cr} \quad (2),$$

$$HRC = 38.99 + 17.48C + 2.55Si - 2.28Ni + 2.37Cr + 8.04Ti \quad (3),$$

wherein $D_O=8.65\times\sqrt{C}$, $f_{Si}=1+0.64\times\%$ Si, $f_{Mn}=1+4.10\times\%$ Mn, $f_P=1+2.83\times\%$ P, $f_S=1\times0.62\times\%$ S, $f_{Cu}=1+0.27\times\%$ Cu, $f_{Ni}=1+0.52\times\%$ Ni, and $f_{Cr}=1+2.33\times\%$ Cr.

3. The method according to claim 2, wherein the wire rod is rolled by hot or cold forming to be formed into the coil spring shape, and the spring is subjected to hot shot peening so as to give a maximum shear stress of 1176 MPa or more.

4. The method according to claim 2, wherein the hot shot peening is performed at 200° C. to 300° C.

5. A spring for a vehicle comprising a steel which comprises C: 0.38 to 0.44%, Si: 2.00 to 2.30%, Mn: 0.99 to 1.25%, Cr: 0.10 to 0.43%, Ni: 0.15 to 0.35%, Cu: 0.15 to 0.35%, Ti: 0.09 to 0.13%, P: 0.02% or less (0% is not included), S: 0.02% or less (0% is not included), Al: 0.003 to 0.10%, N: 0.002 to 0.012%, O: 0.002% or less (0% is not included), by mass %, and the remainder consisting of iron and inevitable impurities;

the steel being formed into a wire rod by hot or cold working, the wire rod being formed into a coil spring shape by rolling, the coil spring being subjected a heat treatment for hardening and tempering, being subjected a hot-setting, being subjected a hot shot peening, and being subjected a pre-setting;

wherein an $Ac_3$ transformation temperature as an indicator of the decarburization performance, which is calculated by Equation (1) below, is from 859° C. to 885° C., a maximum hardened diameter DI as an indicator of the hardening performance, which is calculated by Equation (2) below, is from 70 to 238 mm, and a temper hardness HRC as an indicator of the spring performance, which is calculated by Equation (3) below, is from 50 to 55, $$Ac_3=910-203\times\sqrt{C}-15.2Ni+44.7Si+104V+31.5Mo+13.1W \quad (1),$$

$$DI=D_O\times f_{Si}\times f_{Mn}\times f_P\times f_S\times f_{Cu}\times f_{Ni}\times f_{Cr} \quad (2),$$

$$HRC=38.99+17.48C+2.55Si-2.28Ni+2.37Cr+8.04Ti \quad (3),$$

wherein $D_O=8.65\times\sqrt{C}$, $f_{Si}=1+0.64\times\%$ Si, $f_{Mn}=1+4.10\times\%$ Mn, $f_P=1+2.83\times\%$ P, $f_S=1-0.62\times\%$ S, $f_{Cu}=1+0.27\times\%$ Cu, $f_{Ni}=1+0.52\times\%$ Ni, and $f_{Cr}=1+2.33\times\%$ Cr.

6. The spring according to claim 5, wherein the wire rod is rolled by hot or cold forming to be formed into the coil spring shape, and the spring is subjected to hot shot peening so as to provide a maximum shear stress of 1176 MPa or more.

7. The spring according to claim 5, wherein the hot shot peening is performed at 200° C. to 300° C.

* * * * *